United States Patent [19]

Shiota et al.

[11] Patent Number: 4,780,756
[45] Date of Patent: Oct. 25, 1988

[54] APPARATUS FOR PRODUCING A HARD COPY OF A COLOR PICTURE FROM EITHER A FIELD OR A FRAME OF LUMINANCE AND LINE-SEQUENTIAL COLOR DIFFERENCE VIDEO SIGNALS

[75] Inventors: Kazuo Shiota; Azuchi Endo, both of Ashigarakami, Japan

[73] Assignee: Fuji Photo Film Co., Ltd., Kanagawa, Japan

[21] Appl. No.: 886,253

[22] Filed: Jul. 16, 1986

[30] Foreign Application Priority Data

Jul. 16, 1985 [JP] Japan ................. 60-155120

[51] Int. Cl.⁴ .................. H04N 1/46; H04N 5/84; H04N 7/01; H04N 11/22
[52] U.S. Cl. ......................... 358/78; 358/11; 358/75; 358/140; 358/244; 358/909
[58] Field of Search ............ 358/80, 909, 11, 75, 358/75 IJ, 76, 78, 140, 244, 244.1, 244.2

[56] References Cited

U.S. PATENT DOCUMENTS

| | | | |
|---|---|---|---|
| 4,057,836 | 11/1977 | Munsey | 358/140 |
| 4,298,896 | 11/1981 | Heitmann | 358/11 |
| 4,415,931 | 11/1983 | Dischert | 358/11 |
| 4,468,693 | 8/1984 | Fujita et al. | 358/75 |
| 4,472,741 | 9/1984 | Takatsu et al. | 358/909 |
| 4,485,413 | 11/1984 | Furuta et al. | 358/78 |
| 4,530,004 | 7/1985 | Achiha et al. | 358/11 |
| 4,605,951 | 8/1986 | Kuribayashi | 358/11 |
| 4,623,914 | 4/1986 | Kuribayashi | 358/14 |
| 4,626,910 | 12/1986 | Kawamura | 358/140 |
| 4,651,227 | 3/1987 | Yunoki et al. | 358/909 |
| 4,734,759 | 3/1988 | Koburi et al. | 358/75 |

FOREIGN PATENT DOCUMENTS

| | | | |
|---|---|---|---|
| 54-116126 | 9/1979 | Japan | 358/909 |
| 54-138331 | 10/1979 | Japan | 358/11 |
| 55-142346 | 11/1980 | Japan | 358/75 |
| 56-8141 | 1/1981 | Japan | 358/75 |
| 58-21741 | 2/1983 | Japan | 358/80 |
| 58-92171 | 6/1983 | Japan | 358/11 |
| 57-129877 | 8/1983 | Japan | 358/140 |
| 58-162177 | 9/1983 | Japan | 358/909 |
| 59-89082 | 5/1984 | Japan | 358/909 |
| 59-90482 | 5/1984 | Japan | 358/78 |
| 60-33789 | 2/1985 | Japan | 358/75 |
| 60-24788 | 2/1985 | Japan | . |
| 61-30392 | 9/1986 | Japan | . |

*Primary Examiner*—James J. Groody
*Assistant Examiner*—Randall S. Svihla
*Attorney, Agent, or Firm*—Birch, Stewart, Kolasch & Birch

[57] ABSTRACT

A hard copy of a picture is produced from a single field of video signals representing the picture. A single field of luminance and line-sequential color difference video signals representing a picture is entered to a signal converter to be converted into a frame of video signals, which is in turn stored in a storage. The signal converter produces interpolated luminance signals and interpolated color difference signals. The video signals are then read out of the storage in an interlace raster scanning fashion. A picture display visibly displays the picture represented by the read out video signals. The video signals are also read out of the storage in a sequential scanning fashion. A picture printer receives the sequentially read out video signals and records on a recording medium the picture represented by the video signals.

5 Claims, 7 Drawing Sheets

APPARATUS FOR PRODUCING A HARD COPY OF A COLOR PICTURE FROM EITHER A FIELD OR A FRAME OF LUMINANCE AND LINE-SEQUENTIAL COLOR DIFFERENCE VIDEO SIGNALS

BACKGROUND OF THE INVENTION

1. Field of the Invention

The present invention relates to a picture recording apparatus and, more particularly, to an apparatus for producing a hard copy of a picture which is represented by video signals.

2. Description of the Prior Art

Today, there is a demand for an apparatus which allows picture picked up by an electronic still camera or a television (TV) camera and stored in a magnetic disk adapted for pictures, or so-called video floppy, a video tape or like video signal recording medium to be reproduced in the form of hard copies, i.e., to be recorded in printing papers and other recording media as visible pictures. Desirably, such a recording apparatus should enable a person to see the conditions of a desired picture before actually recording it.

Generally, a predominant type of signal system in the video equipment art is an interlace scanning system in which the number of scanning lines is 525 and the field frequency as 60 hertz as based on the NTSC (National Television Systems Committee) and other common color TV standards. Such standards prescribe that one frame consists of two fields and one field consists of 262.5 scanning lines.

A picture recorded in a printing paper by shooting the screen of a cathode ray tube (CRT) on which a picture being displayed by interlace scanning is apt to suffer from conspicuous pairing of scanning lines due to incomplete interlace scanning. The pairing on the picture is far more significant on a hard copy, or printing paper, than on a soft copy which may be reproduced on a CRT screen.

In light of the above, very severe conditions against pairing should be imposed on recording of a picture which is displayed on a CRT. Therefore, in order that a video signal produced by interlace scanning may be directly used for shooting on the screen, it is necessary that a high-tension circuit adapted to drive the CRT be provided with sufficient stability grading up the circuit to a prohibitive degree.

The pairing problem may readily and surely be solved if the interlace scanning system is replaced with a non-interlace scanning system, i.e. sequential scanning system. However, where a non-interlace scanned picture is displayed on a monitor to meet the demand as previously stated, flicker appears so conspicuously that the picture is not worth seeing. The flicker cannot be eliminated without raising the frame frequency far beyond the ordinary 60 hertz or 30 hertz, again grading up the associated circuits.

Generally, video signals under a wide variety of conditions are entered into a hard copy recording apparatus and, therefore, the signal level is distributed over a considerable range. Such a signal level distribution is quite probable in pictures picked up by, for example, an electronic still camera because an automatic exposure mechanism built in an electronic still camera lacks precision. Moreover, many of the pictures picked up by an electronic still camera involve various shooting conditions other than standard ones. It follows that the colors, density, tone and other factors of a picture must be corrected in order to allow the picture being reproduced to appear as natural as an actual scene picked up. The prerequisite is, therefore, that where a picture represented by video signals is to be reproduced as a hard copy such as a print, a person be capable of compensating the video signals while watching a monitor as has been the case with a prior art video color analyzer.

SUMMARY OF THE INVENTION

It is therefore an object of the present invention to provide an apparatus which is capable of producing a hard copy of a picture with good quality and, thereby, meeting the requirements as discussed above.

An apparatus for producing a hard copy of a picture of the present invention includes a memory for storing one frame of video signals. The video signals are read out of the memory by a signal forming circuit and thereby turned into raster scanning video signals. A picture recording device is interconnected to the signal forming circuit for recording in a recording medium a picture which is represented by the raster scanning video signals. Also interconnected to the signal forming circuit is a picture display adapted to visibly display the picture for monitoring the picture. A controller controls the signal forming circuit to cause the signal forming circuit to read the video signals by interlace scanning out of the memory and apply the video signals thus read out to the picture display, and also to read the video signals by sequential scanning and apply the video signals read out to the picture recording device.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENT

Figure 2:
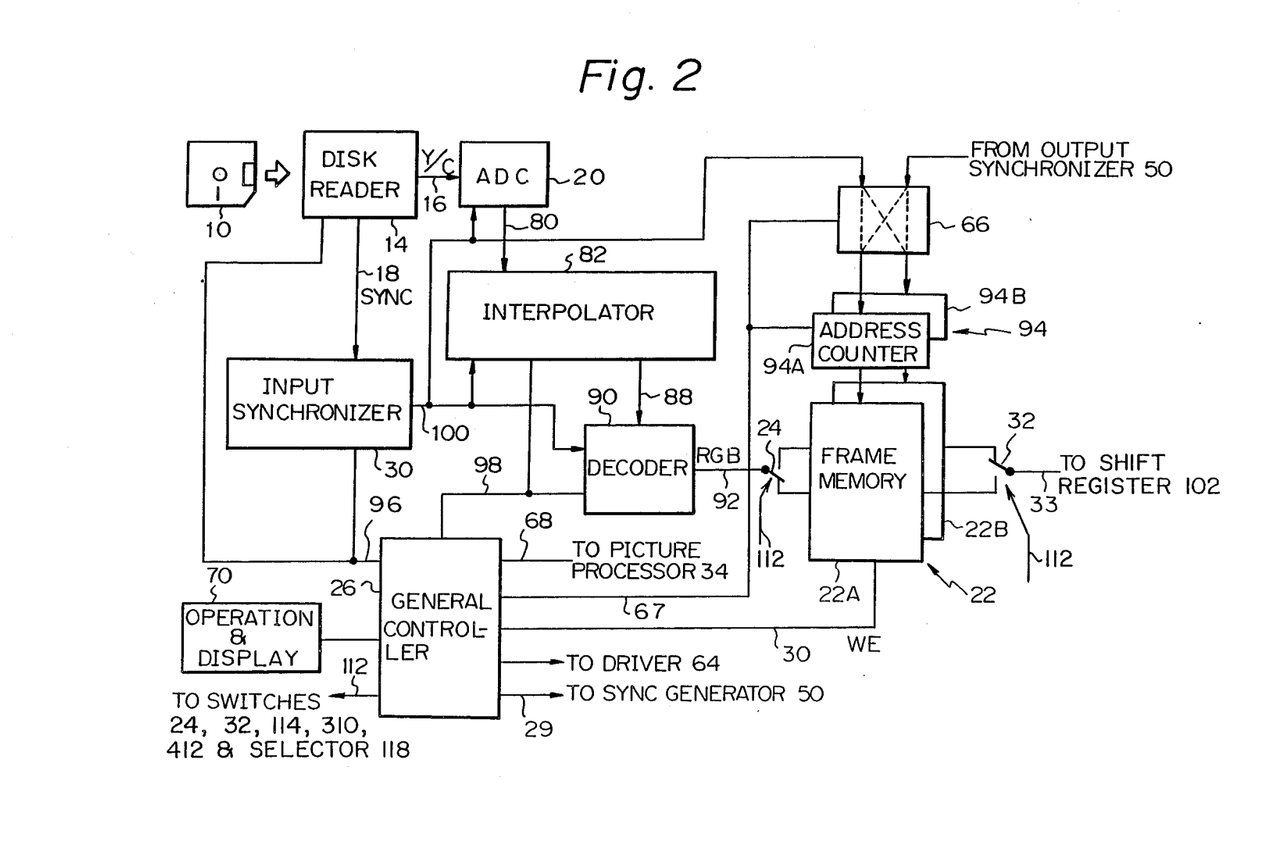
FIG. 2 is a view, similar to FIG. 1, showing the other part of the apparatus.

Referring to FIG. 2 which shows a preferred embodiment of the present invention, pictures picked up by an electronic still camera or the like are stored in a magnetic video disk, or so-called video floppy, 10 in the form of field video signals or frame video signals, and selectively read out of the disk 10 to be reproduced in the form of hard copies on a picture recording medium 12.

In this particular embodiment, video signals are stored in the disk 10 one field per track. The video signals are color-difference line-sequential signals which may consist of luminance signals and color-difference signals recorded in tracks under frequency modulation. The video signals may either be so-called field video signals in which one field constitutes one frame, or so-called frame video signals in which a pair of fields constitute one frame. In the case where frame video signals are used, this particular format is represented by a data signal which is superposed on the video signals. The data signal may advantageously be implemented with a one which is superposed on video signals by a differential phase shift keying (DPSK) system.

The apparatus includes a magnetic disk reading section, or disk reader, 14 which serves as a video signal input device. The disk reader 14 reads video signals out of the disk 10, then demodulates them, then separates luminance (Y) signals and chrominance (C) signals as well as synchronizing (SYNC) signals from the demodulated signals, and then feeds the signals Y and C to a line 16 and the signals SYNC to a line 18. The previously mentioned DPSK data is also read by the disk reader 14. Where a magnetic disk which stores frame video signals is used, the DPSK data informs a general control section, or general controller, 26 of it via a control line 96. In this particular embodiment, the chrominance signals are implemented with line-sequential color-difference signals. If desired, a magnetic tape reader, a receiver connected to a communication link and other video signal input units may be installed in place of or in addition to the disk reader 14.

The signals Y and C are applied over the line 16 to an analog-to-digital converter (ADC) 20 to be individually converted to digital data. The digital data are fed to an interpolating section, or interpolator, 82 over a line 80. As described later in detail, the interpolator 82 functions to interpolate missing portions of the signals Y and C by performing mathematical operations. The output 88 of the interpolator 82 is routed to a decoding section, or decoder, 90.

The decoder 90 decodes the interpolated video signals to three separated-color signals, e.g., three primary color signals RGB which appear at an output 92 of the decoder 90.

The signals RGB are delivered from the output 92 to a frame memory 22 via a switch 24 to be written thereinto. The switch 24 is controlled by the general controller 26. As shown, the frame memory 22 is made up of two store units 22A and 22B so that the video signal data are selectively written into the store units 22A and 22B under the control of the switch 24.

In this particular embodiment, each of the frame memories 22A and 22B is implemented with a random access memory (RAM) having a capacity great enough to accommodate one frame of video signal data. The address of storage locations of frame memories 22A and 22B are controlled by an address counter 94. A memory control signal indicative of whether to write or to read data as well as others is fed from the general controller 26 to the frame memory 22 over a line 30.

The address counter 94 is made up of two units 94A and 94B which are associated with the memories 22A and 22B, respectively. A clock for incrementing the address counter 94 is supplied from an input synchronizing section, or input synchronizer, 30 during data writing and from an output synchronizing section, or output synchronizer, 50 during data reading, each via a switch circuit 66. The address counter 94 is incremented in one mode when data is written into the memory 22 and in another mode when it is read thereoutof, as described later in detail. The switching of the incrementing modes and that of the switch circuit 66 are controlled by the general controller 26 via a control line 67.

The synchronizing signals SYNC separated by the disk reader 14 are fed to the input synchronizer 30. The synchronizer 30 includes a phase-locked loop adapted to prepare various synchronizing signals such as a pixel clock PCLK, a horizontal synchronizing signal HSYNC and a vertical synchronizing signal VSYNC using the input signals SYNC while producing them at an output 100 thereof. With such synchronizing signals, the synchronizer 30 functions to control synchronization of the reading system which reads video signals out of the disk 10. The pixel clock PCLK at the output 100 is routed to the interpolator 82 and the decoder 90 and, via the switch 66, to the address counter 94.

Figures 1, 1A:
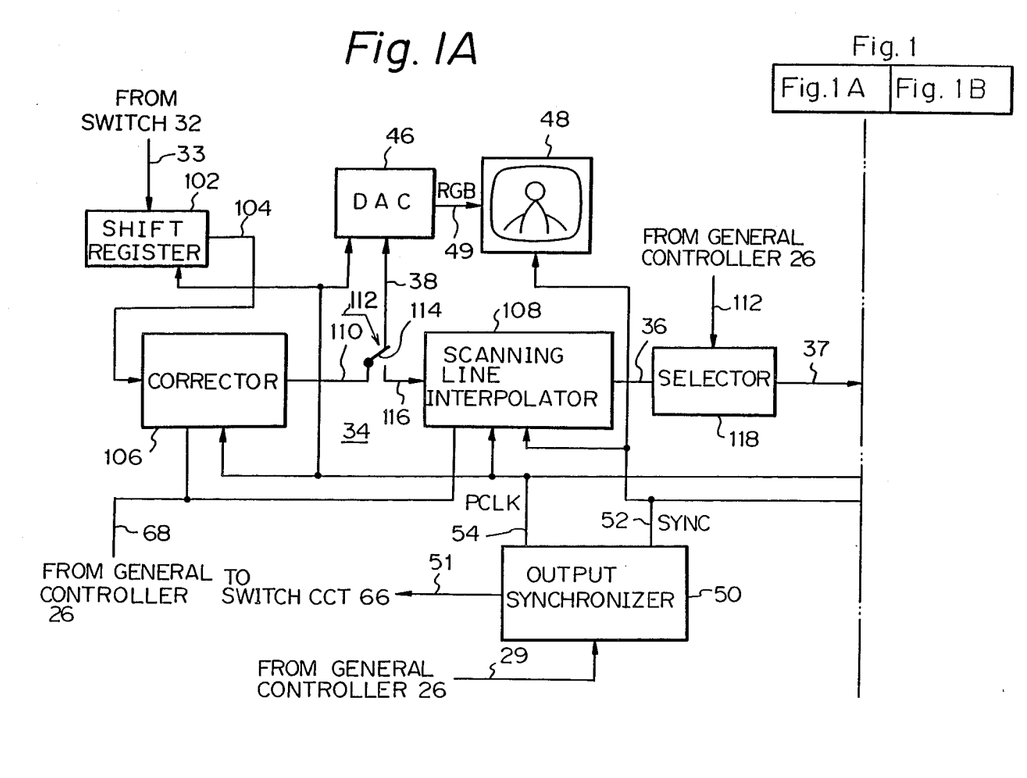
FIGS. 1A and 1B, when combined as shown in FIG. 1, are schematic block diagrams showing a part of a hard copy producing apparatus embodying the present invention.

A switch 32 is controlled by the general controller 26 to selectively apply data read out of the frame memory 22, i.e., video signal data read out of the two units 22A and 22B to an input 33 of a shift register 102, FIG. 1. A picture processing section, or picture processor, 34 is the pivotal section of the apparatus of the present invention. The general controller 26 controls the disk reader 14 and input synchronizer 30 via a control line 96 and the interpolator 82 and decoder 90 via a control line 98.

As symbolically represented by a control line 112 in FIG. 2, the switches 24 and 32 are controlled by the general controller 26 such that, while one of them is connected to one of the memory units 22A or 22B, the other is always connected to the other memory unit. That is, the arrangement is such that while one of the memory units 22A and 22B is conditioned for data writing, the other is conditioned for data reading.

Figure 1B:
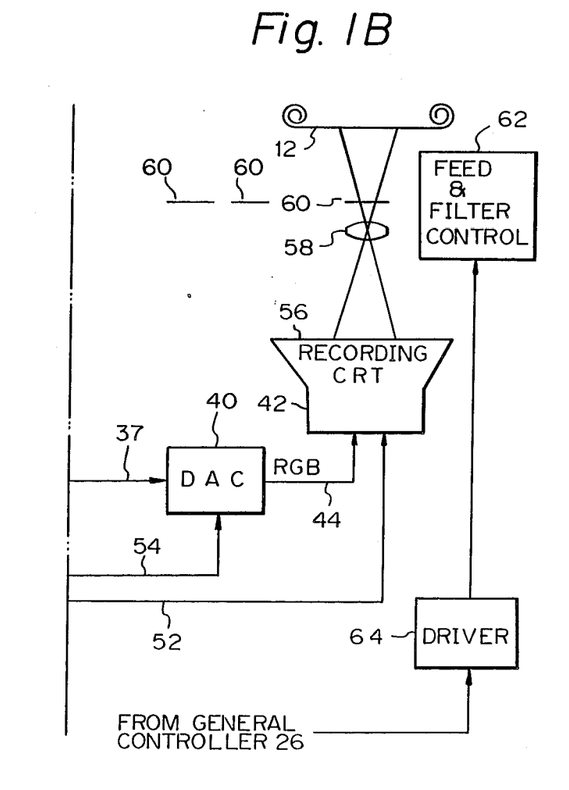

Referring to FIGS. 1A and 1B, video signal data read in parallel out of the memory unit 22A or 22B are applied to the shift register 102 via the switch 32, as previously stated. The shift register 102 serves as a parallel-to-serial conversion circuit adapted to produce the input parallel video signal data sequentially at an output 104 thereof in response to the synchronizing signals SYNC, which are applied to the shift register 102 from the output synchronizer 50 via a control line 52. The output 104 of the shift register 102 is interconnected to the picture processor section 34.

The section 34 is made up of a correcting subsection, or corrector, 106 for performing various kinds of picture processing such as adjustment of color balance, white balance, tone and density of a reproduced picture and, in this particular embodiment, a scanning line interpolating subsection, or scanning line interpolator, 108 the operation of which will be described. The video signal data are subjected to the picture processing in response to a control signal which the general controller 26 supplies over a control output 68 after decoding a picture processing command, which is entered through an operation and display section 70.

Figure 3:
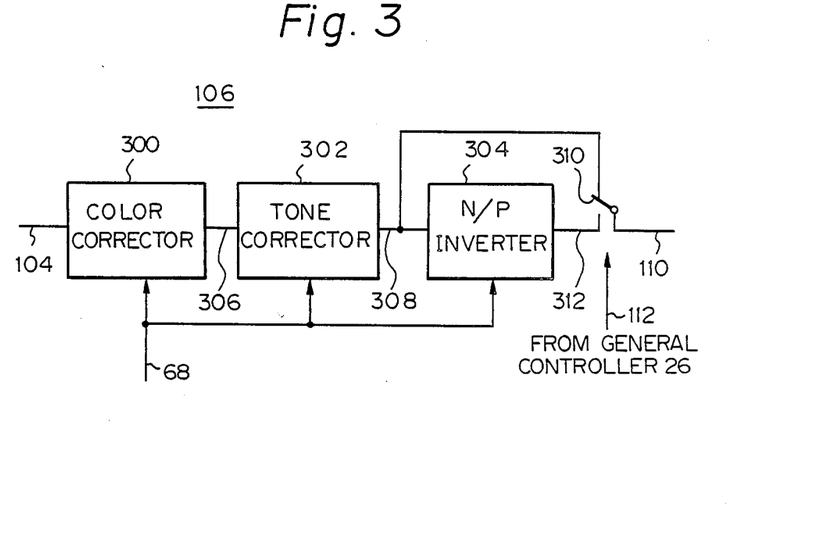
FIG. 3 is a block diagram showing a specific cnstruction of a correcting section shown in FIG. 1.

Referring to FIG. 3, the corrector 106 comprises a color correcting subsection, or color corrector, 300, a tone correcting subsection, or tone corrector, 302, and a negative-to-positive (N/P) inverting subsection, or N/P inverter, 304. The color corrector 300 plays the role of a picture processing circuit which responsive to the output 104 of the shift register 102 corrects the color balance and white balance of a picture which is represented by the video signals. Conditions for the correction are set up by the general controller 26 via the control line 68 and may be varied frame by frame by manipulating the operation and display section 70.

The output 306 of the color corrector 300 is interconnected to the tone corrector 302 which serves as a picture processing circuit adapted to correct the density and tone of a picture as represented by the video signals. Again, conditions for the correction are set up from the general control 26 via the control line 68 and may be varied frame by frame by manipulating the operation and display section 70.

The output 308 of the tone corrector 302 is interconnected to an output line 110 by way of a switch 310 and to the N/P inverter 304. The N/P inverter 304 is a picture processing circuit operative to invert the video signals applied to the input 308 so as to match them to particular negative photosensitivity and tone of a printing paper, which is applicable to the apparatus as the medium 12. Conditions concerned with such characteristics, too, are established by the general controller 26 via the control line 68 responsive to manipulation of the operation and display section 70.

The switch 310 is controlled by the general controller 26, as symbolically indicated by the control line 112 extending from the controller 26. While a picture is reproduced on a monitor 48, the switch 310 is positioned as illustrated so that video signals appearing on the output 308 of the color corrector 300 are directly routed to the output 110. While a picture is reproduced on a recording CRT 42, on the other hand, the switch 310 is actuated to a position opposite to the illustrated so as to feed the video signals from an output 312 of the N/P inverter 304 to the output 110.

The output 110 of the corrector 106 is interconnected to an input 116 of the scanning line interpolator 108 and an input 38 of a digital-to-analog converting section (DAC) 46 via a switch 114.

Figure 4:
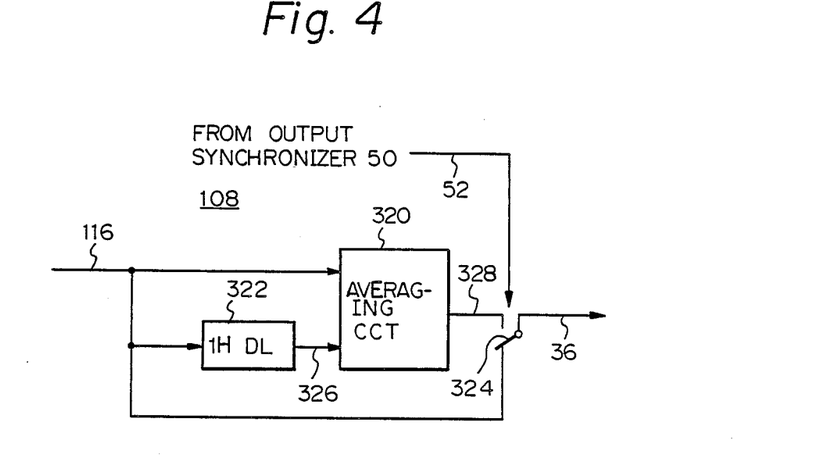
FIG. 4 is a block diagram showing a specific construction of a scanning line interpolating section also shown in FIG. 1.

As shown in FIG. 4, in the illustrative embodiment, the interpolator 108 comprises an averaging circuit 320 and a delay circuit (1HDL) 322. The input 116 is interconnected to the inputs of the two circuits 320 and 322 as well as to a switch 324. The output 326 of the delay circuit 322 is interconnected to the other input of the circuit 320. The delay circuit 322 sequentially receives video signals at the input 116 and sequentially produces them at the output 326 after delaying them by one horizontal scanning period (1H).

The averaging circuit 320 functions to simply add and average video signals which are sequentially applied thereto from the two inputs 116 and 326 and deviated by 1H from each other, on the basis of corresponding pixel positions. The output 328 of the circuit 320 is interconnected to an output line 36 via the switch 324. The switch 324 alternates its two different states timed to the horizontal synchronizing signals HSYNC which are supplied from the output synchronizer 50 over the line 52.

Referring again to FIGS. 1A and 1B, one input 36 of the picture processing section 34 is routed through a selector 118 and a DAC 40 to a color signal input terminal 44 of a picture output unit for recording, e.g., CRT 42. The output 38 of the picture processor 34 is interconnected to a color signal input terminal 49 of the monitor 48 via the DAC 46. The selector 118 serves as a switchover circuit which, as symbolically represented by the control line 112, is controlled by the general controller 26 to select one of the three separated color video signals appearing at the output 36 of the picture processor 34 and delivers it to an output 37.

Connected to synchronizing signal input terminals of the CRT 42 and monitor 48 is the synchronizing signal output terminal 52 of the output synchronizer 50. The CRT 42 and monitor 48 constitute a picture output device adapted to visualize frame video signals.

The output synchronizer 50 includes a self-driven reference oscillator, not shown, and functions to generate various kinds of clocks for controlling chiefly the recording system of the apparatus, e.g. synchronizing signals SYNC and pixel clock PCLK. These clocks are fed from an output 54 of the output synchronizer 50 to the picture processor 34, shift register 102, and DACs 40 and 46. Further, the synchronizer 50 produces at an output 51 a clock for incrementing the address counter 94. As shown, the synchronizer 50 is controlled by the general controller 26 via a control line 29.

The positions of the switches 114 and 310, FIG. 3, are controlled by the general controller 26, as represented by the control line 112. Both of the switches 114 and 310 are actuated to the illustrated positions when video signals are to be fed to the monitor 48 by interlace scanning, and to opposite positions to the illustrated when video signals are to be fed to the CRT 42 by non-interlace scanning, i.e. sequential scanning.

The monitor 48 may advantageously be implemented with a ordinary color CRT display. The three color-separated video signal data read out of the frame memory 22 under the control of the general controller 26 are processed by the picture processing section 34 and, then, fed to the monitor 48 by two-field one-frame interlace scanning. Advantageously, the signal rate may comprise an ordinary TV signal rate, e.g. 525 scanning lines and 1/60 seconds interlacing. A monitor which is compatible with such an ordinary color TV signal system is desirable from the construction and economy standpoint. Another advantage attainable with such a monitor is that it can display pictures in the same conditions as those which may be reproduced by a monitor that is readily accessible by an ordinary person.

The CRT 42 for recording pictures may advantageously be implemented with a black-and-white CRT. The three separated-color signals which have been processed by the picture processor 34 are supplied to the CRT 42 by sequential or non-interlace scanning. In this particular embodiment, the supply of video signals is effected by a 1,050 scanning lines, 1/15 seconds fame period non-interlace scanning system. If desired, however, the scanning line interpolator 108 may be omitted and, instead, the line 116 may be directly interconnected to the input 36 of the DAC 40. In that case, a 525 scanning lines, 1/30 seconds frame period non-interlace scanning system may advantageously be used.

The period of time for producing the respective separated-color signals may be substantially one second per screen of one separated color, for example, although it depends upon the radiation characteristics of the CRT 42, photosensitivity of the recording medium 12, etc. The general controller 26 controls the picture recording operation such that, for example, a video signal representative of an R-color screen is read out of the frame memory 22 to be displayed for substantially one second on the CRT 42, then a G-color screen also for substantially one second, and then a B-color screen also for substantially one second.

So far as a picture displayed on a screen 56 of the CRT 42 is concerned, flicker and other difficulties from the visual sensation standpoint do not matter at all. Rather, the non-interlace scanning system which is least possible to cause pairing of scanning lines is desirable from the viewpoint of making the effect of raster inconspicuous. In addition, the non-interlace scanning system is capable of readily performing vertical interpolation adapted for elimination of false colors and other various kinds of picture processing, as will be described.

Figure 5:
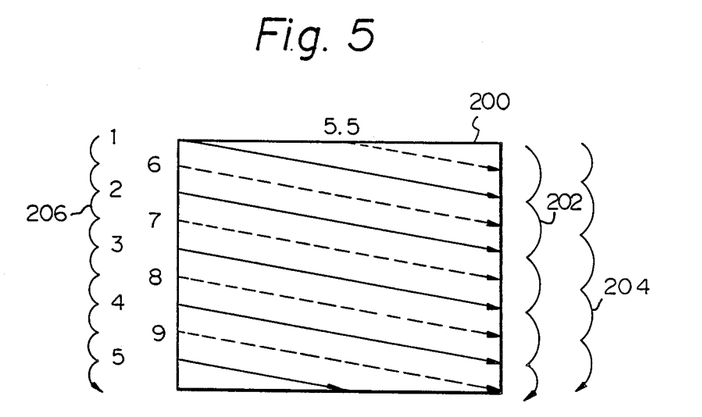
FIGS. 5, 6 and 7 are views useful for understanding a procedure for forming video signals in a first and a second fields in operation of the FIG. 1 embodiment.

Referring to FIG. 5, there is shown a frame screen 200 which is assumed to consist of only nine scanning lines for the simplicity of description. The frame screen 200 is interlace-scanned such that those scanning lines as represented by solid lines complete a first field and those as represented by phantom lines, a second field.

Where video signals are to be read out of the disk 10 and written into the frame memory 22, vertical scanning is effected sequentially as indicated by arrows 202 and 204 at the right-hand side of FIG. 5 in order to complete the frame screen 200. Specifically, interlace-scanning of horizontal scanning lines #1, #2, . . . , #5 of the first field to horizontal scanning lines #6, #7, . . . , #9 of the second field is repeated. Controlled by the general controller 26, the address counter 94 is conditioned to interlace-scan the addresses of the frame memory 22 in the above-stated manner. As a result, video signal data are written into one of the frame memories 22A and 22B by interlace-scanning.

Where use is made of a magnetic disk which has stored field video signals, the interpolator 82 converts the signals to frame video signals by interpolating luminance signals associated with the second field and missing chrominance signals by a predetermined mathematical operation, the frame video signals being written into the frame memory 22, as will be described. On the other hand, where the disk has stored frame video signals, the interpolator 22 delivers the frame video signals as they are so that the signals are stored in the frame memory 22, as will also be described.

During reproduction, the video monitor 48, too, is vertically scanned as indicated by the arrows 202 and 204 in FIG. 5 in the same manner as the frame memory 22 in order to complete the frame screen 200.

Meanwhile, to output the video signals forming the frame screen 200 to the CRT 42 for a recording application, the frame screen 200 is vertically scanned as indicated by an arrow 206 at the left-hand side of FIG. 5. Specifically, the frame screen 200 is repeatedly non-interlace or sequentially scanned from the top toward the bottom without discriminating the first and second fields, i.e., in the order of horizontal scanning lines #1, #6, #2, #7, . . . , #9, #5. At this instant, the address counter 94 is conditioned by the general controller 26 to sequentially scan the addresses of the frame memory 22 in compliance with the above-mentioned order of the scanning lines. Consequently, video signal data are sequentially read out of the other frame memory 22B or 22A which is not writing data therein, according to the order of the scanning lines being scanned.

Figure 6:
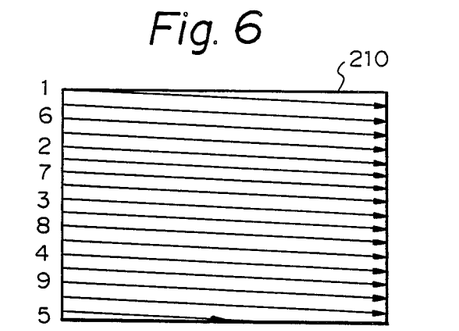

As described above, in this particular embodiment, the video signals read out of the frame memory 22 according to the order of scanning lines are doubled in the number of scanning lines by the scanning line interpolator 108. Hence, the video signals are reproduced by the CRT 42 in a non-interlaced screen having 1,050 scanning lines and a frame period of 1/15 second. A screen 210 derived from the screen 200 on the non-interlace scanning basis is shown in FIG. 6.

The screen 56 of the CRT 42 is photographed through a lens 58 so that the frame picture appearing on the screen 56 is focused onto the photosensitive surface of the recording medium 12. Color filters 60 associated with the three separated colors, respectively, are located behind the lens 58 and positioned on the optical axis of the lens 58 one at a time. Selection of the filters 60 and the feed of the medium 12 are performed by a feed and filter control section 62 which is in turn controlled by the general controller 26 via a drive circuit, or driver, 64. These in combination constitute a hard copy producing apparatus adapted to visualize a frame picture and reproduce it on the medium 12 as a hard copy.

The general controller 26 collectively controls the operations of the whole apparatus and may advantageously be implemented with a microprocessor or like processing unit. Interconnected to the controller 26 are such an input unit as a keyboard which is manipulatable to enter commands into the apparatus, and the operation and display section 70 adapted to show an operator various internal conditions of the apparatus as well as commands.

Figure 8:
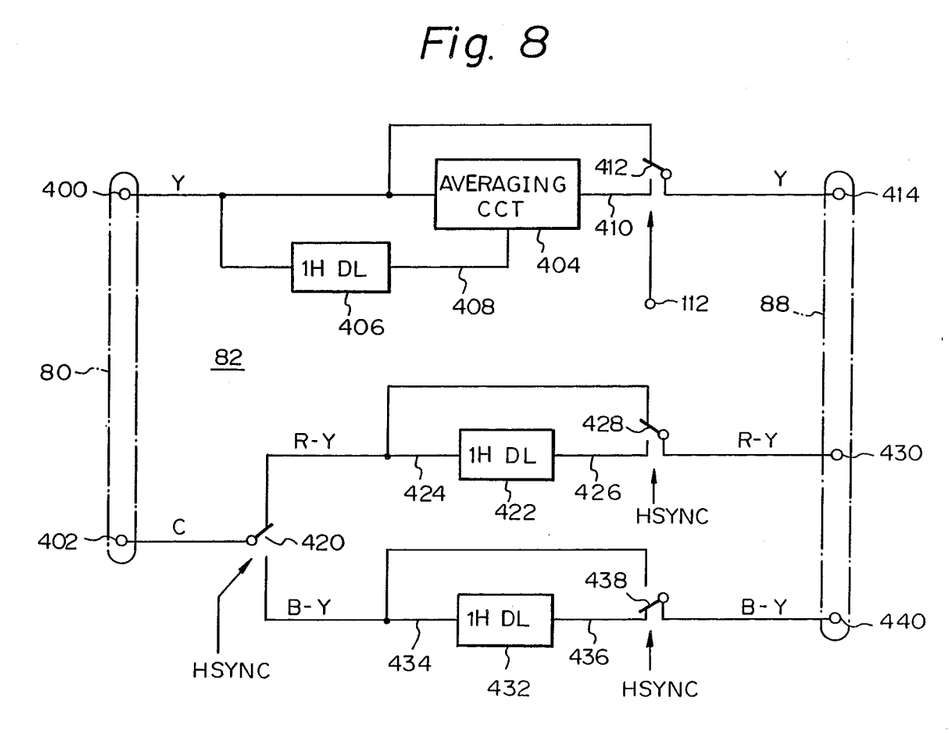
FIG. 8 is a block diagram showing a specific construction of an interpolating section shown in FIG. 2.

Referring to FIG. 8, a specific construction of the interpolator 82 is shown. Among the video data which are applied from the ADC 20 to the interpolator 82 over the line 80, the luminance signals Y are fed to a terminal 400 and the chroma signals C to a terminal 402. The terminal 400 is interconnected to an output of an averaging circuit 404 and that of a delay circuit (1HDL) 406. The output 408 of the delay circuit 406 is interconnected to the other input of the averaging circuit 404. The delay circuit 406 sequentially receives luminance signals at the input 400 and sequentially delivers them to the output 408 after delaying them one horizontal scanning period (1H).

The averaging circuit 404 functions to simply add and average the luminance signals sequentially applied thereto via the two inputs 400 and 408, on the basis of corresponding pixel positions. The output 410 of the circuit 404 is interconnected to a terminal 414 via a switch 412. The switch 412 is actuated by a control signal which is applied thereto from the general controller 26 over a control line 112. When the DPSK data signal associated with the disk 10 indicates that the disk 10 has stored frame video signals, the controller 26 delivers a control signal which actuates the switch 412 to the illustrated position. When the DPSK data is representative of field video signals, the controller 26 delivers a control signal which alternately actuates the switch 412 to the illustrated position and the opposite position timed to the vertical synchronizing signals VSYNC. The input 400 is interconnected to the output 414 via a terminal of the switch 412.

Applied to the terminal 402 are the chroma signals C. The terminal 402 is interconnected to an input 424 of a delay circuit 422 via a switch 420 which is responsive to the horizontal synchronizing signals HSYNC, which are supplied from the output 100 of the input synchronizer 30. The delay circuit 422 receives sequentially appearing chroma signals at the input 424 and sequentially produces them at an output 426 after delaying them 1H. The output 426 of the delay circuit 422 is interconnected to an output 430 via a switch 428 which is similar to the switch 420. The input 424 of the delay circuit 422 is further connected to the output 430 bypassing the delay circuit 422 via a terminal of the switch 428.

In a position opposite to the illustrated, the switch 420 connects the terminal 402 to an input 434 of a delay circuit 432. The delay circuit 432 sequentially receives chroma signals and sequentially produces them at an output 436 after delaying them by 1H. The output 436 of the circuit 432 is interconnected to an output 440 via a switch 438 which is similar to the switch 428. The input 434 of the circuit 432 is connected also to the output 440 bypassing the circuit 432 via a terminal of the switch 438. The output terminals 414, 430 and 440 of this circuitry are interconnected to the decoder 90.

The switch 420 alternately assumes the two positions timed to the horizontal synchronizing signals HSYNC which are routed from the input synchronizer 30 through the control line 100. In this particular embodiment, the chroma signals comprise R−Y and B−Y color difference signals and line-sequentially arrive at the terminal 402. The position of the switch 420 is controlled such that the R−Y signal is routed toward the delay circuit 422 and the B−Y signal toward the delay circuit 432.

Each of the switches 428 and 438 alternately assumes the illustrated position and the opposite position in synchronism with the horizontal synchronizing signals HSYNC which are fed from the input synchronizer 30 over the control line 100.

In this embodiment, line-sequential chrominance signals associated with the same picture are repeatedly read out of the disk 10 over each field period. Identifying that the video signals stored in the disk 10 are frame video signals via the disk reader 14, the general controller 26 fixes the switch 412 which is included in the interpolator 82 at the illustrated position.

In this condition, the luminance signals Y are delivered from the output 414 to the decoder 90 as they are over both of the first and second fields. Meanwhile, concerning the chroma signals C, because the switches 420, 428 and 438 each alternately assumes the illustrated position and the opposite position timed to the horizontal synchronizing signals HSYNC, the same color difference signal R−Y appears at the output 430 two consecutive horizontal scanning lines at a time while the same color difference signal B−Y appears at the output 440 two horizontal scanning lines at a time. As a result, the luminance signals are delivered to the output 88 of the decoder 90 as they are and the chrominance signals with line-sequential missing portions thereof interpolated.

Where the video signals stored in the disk 10 are field video signals, the general controller 26 causes the switch 412 of the interpolator 82 to alternately assume the opposite positions in synchronism with the vertical synchronizing signals VSYNC. Each of the switches 420, 428 and 438 is alternately brought to the opposite positions thereof timed to the horizontal synchronizing signals HSYNC. Consequently, missing portions of the luminance signals and chroma signals are interpolated by the interpolator 82 on a one horizontal scanning line basis over both of the first and second fields.

Figure 9A:
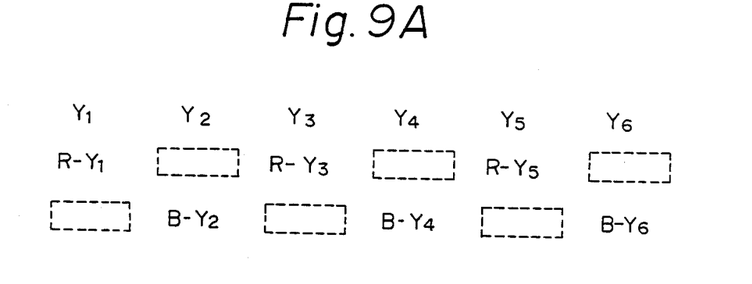
FIGS. 9A, 9B and 9C are views useful for understanding respectively manners of interpolation of original video signals, video signals in the first field and video signals in the second field with respect to the first to the sixth horizontal scanning lines in operation of the circuitry shown FIG. 1.

In detail, as represented by the first to sixth horizontal scanning lines in FIG. 9A, the line-sequential chrominance video signals which arrive at the input 80 of the interpolator section 82 are missing as represented by dotted rectangles. In FIG. 9A, the numerals designate the numbers assigned to the horizontal scanning lines.

Figure 9B:
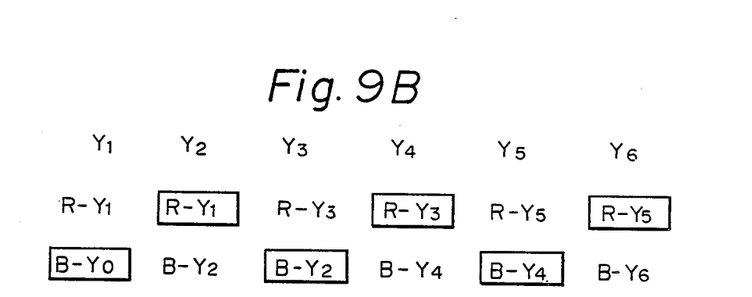
Figure 9C:
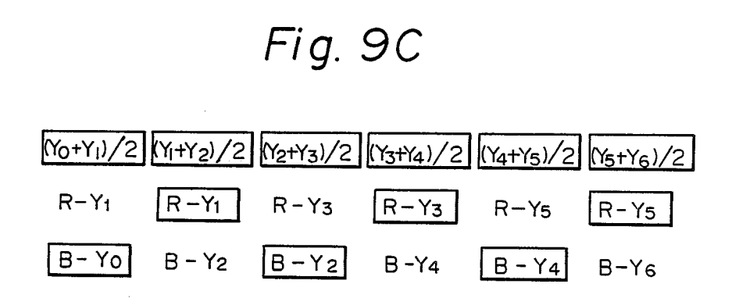

Concerning the luminance signals, the luminance signals Y appearing at the output 400 are directly used as those in the first field as shown in FIG. 9B. The luminance signals in the second field are produced by simply adding and averaging luminance signals associated with pixels on the "n−1" horizontal scanning line, signals Yn−1, and those associated with corresponding pixels on the "n" horizontal scanning line, signals Yn, each of the signals Yn−1 and Yn also arriving at the input 400. The resultant luminance signals in the second field are shown in FIG. 9C. In FIGS. 9B and 9C, solid rectangles represent those signals which have been interpolated.

As for the chroma signals, the same color difference signals R−Y appear at the output 430 two horizontal scanning lines at a time while the same color difference signals B−Y appear at the output 440 two horizontal scanning lines at a time, as has been the case with the previously discussed frame video signals. This is true with both of the first and second fields. The resultant chrominance signals in the first field are shown in FIG. 9B and those in the second field in FIG. 9C, and they are identical with each other.

The video signals with missing portions thereof interpolated in the above-described manner are converted by the decoder 90 to three separated-color signals and, then, stored in the memory 22.

As described above, in this particular embodiment, the same chroma signals are applied to each two consecutive scanning lines both in the first and second fields while luminance signals appearing at the output 400 are directly used for the first field and, for the second field, simply added and averaged with respect to corresponding pixels of each two consecutive scanning lines. The video signals, therefore, involve a minimum of color difference and allow edges of images to appear smoothly changing, achieving a relatively high degree of sharpness.

Should the chroma signals be averaged as the luminance signals, the color difference due to averaging would be aggravated to result in the need for a delay circuit and other circuit elements and, thereby, make the circuit arrangement complicated, because of the fact that chroma signals appear line-sequentially. In accordance with this embodiment, pictures with excellent quality can be recorded and displayed without encountering such noticeable color difference or resorting to an intricate circuitry.

The general controller 26 controls the frame memory 22, picture processor 34 and other various sections of the apparatus to read video signals out of the disk 10 and sequentially record them in the medium 12 in the form of a color picture. Specifically, a video signal stored in one track of the disk 10 is read out by the disk reader 14, then decoded, and then stored in any one of the frame memories 22A and 22B as three separated-color signals. In this instance, addresses in the memory locations of which the signals are to be written are fed to the memory 22A or 22B from the address counter 94 which is incremented by the increment clock produced by the input synchronizer 30. It follows that in the illustrative embodiment one field of video signals are sequentially written into the associated address locations of the frame memory 22A or 22B with missing portions thereof interpolated by the interpolator 82.

For example, when the memory 22A has been loaded with one frame of video signals, the picture processor 34 reads them out in a predetermined sequence as will be described. Then, the video signals are fed to the monitor 48 at the TV signal rate and to the recording CRT 42 on a non-interlace basis, each as three separated-colors frame video signals.

To display a picture on the monitor 48, the controller 26 brings the switches 310 and 114 to the illustrated positions and conditions the address counter 94 to be incremented according to interlace-scanning. In this condition, the address counter 94 is incremented in such a manner as to sequentially read video signal data which are stored in the memory 22A or 22B by interlace-scanning, in response to the increment clock which is fed from the output 51 of the output synchronizing section 50 via the switch circuit 66.

The above readout procedure is sequentially repeated on every other scanning line until two fields of video signals have been read out by interlace-scanning. As a result, at the output 33 of the frame memory 22, the first and second fields of video signals sequentially appear in the particular order as represented by the arrows 202 and 204 in FIG. 5, i.e., on an interlace basis. In this instance, the address counter 94 is set such that readout of the video signal on the first horizontal scanning line in the second field begins at the end of readout of a video signal on the last scanning line in the first field and at a particular pixel located at the 0.5H position.

The interlaced video signals are converted by the shift register 102 to serial signals which are then applied to the corrector 106. In response, the corrector 106 subjects the input video signals to color correction and tone correction in compliance with conditions currently set up, the corrected signals being fed via the switch 310 to the output 110. The signal from the output 110 is routed through the switch 114 to the DAC 46 to be converted to analog signals, so that the signals are visualized on the monitor 48.

The operator may manipulate the operation and display section 70 while watching the monitor 48 so as to enter image processing commands which are adapted to adjust various control parameters, e.g. density, tone, color balance and white balance of the reproduced picture. Any of the commands entered is decoded by the controller 26 and then applied to the corrector 106 of the picture processor 34 over the control line 68, whereby a parameter associated with the command is controlled. Video signal data subjected to adequate picture processing as stated are fed to the output 110.

A command for causing the data to be recorded in the medium 12 is entered through the operation and display section 70. To output a picture to the CRT 42, the controller 26 actuates the switches 310 and 114 to the opposite positions to the illustrated. At the same time, the controller 26 conditions the address counter 94 such that the latter is incremented by sequental scanning, i.e., non-interlace scanning with regard to the addresses of the memory 22 where video signal data are stored. The address counter 94 is therefore incremented in such a manner as to read the video signal data out of the memory 22A or 22B, which is not writing data then, by sequential or non-interlace scanning. Again, the increment clock is fed from the output synchronizer 50.

Such readout is sequentially repeated on the consecutive scanning lines until two fields of video signals have been read out as one frame by non-interlace scanning. Consequently, one frame of video signals appear at the output 33 of the frame memory 22 in the particular order as represented by the arrow 206 in FIG. 5, i.e. by non-interlace scanning.

The video signals are converted by the shift register 102 to serial signals which are then applied to the corrector 106. In response, the corrector 106 subjects the input video signals to color correction and tone correction, and N/P conversion which is effected by the N/P converter 304 as well as tone correction associated with the N/P conversion. The video signals corrected by the corrector 106 is fed to the output 110 via the switch 310 and further to the scanning line interpolator 108 via the switch 114.

In this particular embodiment, the interpolator 108 doubles the number of scanning lines as previously mentioned so that non-interlaced video signals are provided with 1,050 scanning lines and a frame period of 1/15 second.

Referring to FIG. 4, the switch 324 alternates its positions in response to the horizontal scanning signals HSYNC which are fed thereto from the output synchronizer 50. Hence, for a certain 1H period a 1H of video signals which have appeared at the input 116 are directly applied to the output 36 of the interpolator and, for the next 1H, a simple mean of video signals which have appeared at the input 116 during the immediately preceding 1H period and then delayed 1H by the delay circuit 322 and video signals which have appeared at the input 116 during the current 1H period. This procedure is repeated to double the number of horizontal scanning lines.

In this manner, non-interlaced video signals with a doubled number of scanning lines are delivered from the output 36 of the interpolator 108 to the selector 118. At this instant, the general controller 26 conditions the selector 118 in such a manner as to select one of the separated-color video signals, e.g. R video signal. Then, among the video signals outputted by the picture processor 34, only the R video signal will be applied via the DAC 40 to the CRT 42 to be displayed on the screen 56.

In the above instance, the general controller 26 has already controlled the feed and filter controller 62 to feed the medium 12 and position a fresh photosensitive surface of the medium 12 in a predetermined exposure station. Also, the controller 26 has brought one of the filters 60 to the optical axis of the lens 58. Naturally, a particular filter which matches with the separated color video signal to be fed to the CRT 42 is selected. As a result, images in one separated color are recorded as latent images in the photosensitive surface of the medium 12.

Figure 7:
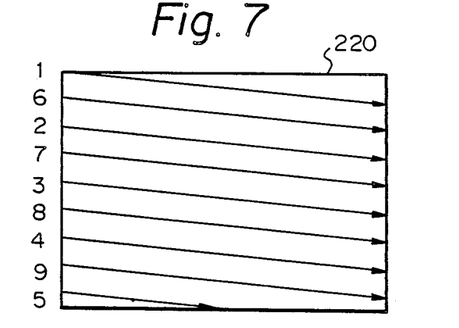

The controller 26 repeats the above-stated sequence of events without feeding the medium 12, while causing the selector 118 to select the other colors one after another. This allows the video signals in the other two colors to be delivered to the CRT 42 with the result that their associated images are photographed and recorded in the same frame of the medium 12 as the images in the first color. When the medium 12 is developed afterwards, in the case of the exemplary screen 200 as shown in FIG. 5, a color hard copy of one frame picture 210 as shown in FIG. 6 will be produced. Sequential scanning as discussed above is successful to record a picture which has undergone desirable effects of making raster inconspicuous and is free from the possibility of scanning lines being paired.

Where an alternative construction which lacks the scanning line interpolator 108 as permissible in accordance with the present invention is chosen, the number of scanning lines is not increased as shown in FIG. 7. That is, in this particular embodiment, a non-interlaced picture is reproduced with 525 scanning lines and a frame period of 1/30 second.

It will be seen from the above that in this embodiment when video signals are read out of the frame memory 22 to be applied to the output device 42 for recording, they may be applied to the monitor 48 as well. Hence, the operator is allowed to enter various picture correction commands while looking at the picture which is being displayed on the monitor 48, so that the corrected video signals are fed to the output device 42 to produce an adequate hard copy.

Such recording and monitoring of a picture can be realized by means of a simple construction adapted to select a timing at which video signals are to be read out of the frame memory 22. Under this timing control, the video signals applied to the monitor 48 are compatible with an ordinary TV signal rate and, therefore, a commercially available commonplace monitor is advantageously adaptable. Further, the recording device 42 is supplied with video signals with the effect of raster removed by non-interlacing, which is suitable for recording a picture in the medium 12.

The advantage attainable with non-interlacing is that in the case of frame video signals the sharpness of pictures and vertical interpolation processing can be implemented with a relatively simple circuit construction such as a one for sequentially reading video signals out of a memory and delaying them. Specifically, as regards interlace video signals, signals on two spatially nearby scanning lines in a screen of one frame are apart from each other by one field period in terms of time so that, to obtain a correlation between nearby pixels for sharpness and other kinds of processing, there is needed a circuit which is capable of delaying, or storing, one field of video signals. When it comes to non-interlaced video signals, signals on two spatially nearby scanning lines are adjacent to each other in terms of time as well, i.e., the time gap is only one horizontal scanning period; a delay circuit furnished with only a 1H delay capability suffices.

The apparatus in accordance with the present invention is effectively applicable not only to a picture recording system which is implemented with a CRT as shown and described but also to a laser recording system, a liquid crystal recording system, a thermal recording system, an ink jet recording system, an electrophotographic system, and other various kinds of recording systems.

It will be seen from the foregoing that in accordance with the present invention video signals stored in a picture data memory are read thereoutof on a non-interlace basis to be applied to a picture output device adapted for recording. This allows a stable reproduced picture which is free from pairing to be recorded in a recording medium without resorting to an advanced construction. Further, while the same picture may be applied to a monitor, too, such is performed by reading video signals out of the memory by interlacing. Therefore, the monitor may be implemented with a commonplace one which is compatible with a usual TV system, further promoting simplification of the construction.

Meanwhile, as the operator enters various kinds of picture correction commands while watching a picture being displayed on the monitor, video signals corrected accordingly are applied to the output device which then produces an adequate hard copy of the signals. A single circuit for performing such corrections is shared by a monitoring system and a recording system to enhance simplicity of construction.

Thus, a hard copy of a picture is achievable with excellent quality.

While the present invention has been described with reference to the particular illustrative embodiment, it is not to be restricted by that embodiment but only by the appended claims. It is to be appreciated that those skilled in the art can change or modify the embodiment without departing from the scope and spirit of the present invention.

What is claimed is:

1. An apparatus for producing a hard copy of a picture from at least one field of video signals representing the picture, comprising:
   input means for receiving the at least one field of video signals representing the picture;
   signal converting means for converting the at least one field of video signals received by said input means into a frame of video signals including two interlaced fields of video signals;
   store means for storing the frame of video signals;
   signal forming means for reading the frame of video signals out of said store means to form raster scanning video signals representing the picture;
   picture recording means interconnected with said signal forming means for recording on a recording medium the picture represented by the raster scanning video signals;
   picture display means interconnected with said signal forming means for visibly displaying the picture represented by the raster scanning video signals; and
   control means for controlling said signal forming means to cause said signal forming means to read the frame of video signals out of said store means in an interlaced scanning fashion to form interlaced raster scanning video signals and to apply the interlaced raster scanning video signals to said picture display means, and to read the frame of video signals out of said store means in a sequential scanning fashion to form sequential raster scanning video signals and to apply the sequential raster scanning video signals to said picture recording means;
   the at least one field of video signals received by said input means including a pair of color difference signals appearing alternately in horizontal scanning lines of the at least one field of video signals, and
   said signal converting means comprising means for compensating for the ones of the pair of color difference signals which are alternately missing from the horizontal scanning lines of the at least one field of video signals.

2. An apparatus in accordance with claim 1, wherein said signal forming means comprises correcting means for correcting at least the color or gradation of the picture represented by the raster scanning video signals.

3. An apparatus in accordance with claim 1, wherein said signal forming means comprises scanning line interpolating means for vertically interpolating the frame of video signals when said control means causes said signal forming means to read the frame of video signals out of said store means in a sequential scanning fashion.

4. An apparatus in accordance with claim 1, wherein the at least one field of video signals is stored on a magnetic disk, and said input means comprises means for reading the at least one field of video signals from said magnetic disk.

5. An apparatus in accordance with claim 4, wherein the at least one field of video signals is stored on said magnetic disk in the form of either a single field of video signal or a frame of video signals including two interlaced fields of video. signals, together with data representative of the form in which the at least one field of video signals is stored on said magnetic disk;

said reading means also reads the data from said magnetic disk; and     said control means also being for controlling said signal converting means in response to the data read from said magnetic disk to cause said signal converting means to convert the at least one field of video signals read from said magnetic disk to a frame of video signals including two interlaced fields of video signals if the at least one field of video signals is stored on said magnetic disk in the form of a single field of video signals, and to cause said signal converting means to use the at least one field of video signals read from said magnetic disk as a frame of video signals including two interlaced fields of video signals if the at least one field of video signals is stored on said magnetic disk as a frame of video signals including two interlaced fields of video signals.

* * * * *